US009867384B2

(12) United States Patent
Lin

(10) Patent No.: US 9,867,384 B2
(45) Date of Patent: Jan. 16, 2018

(54) GREEK YOGURT MAKING DEVICE

(71) Applicant: Fong Lin, Glendale, CA (US)

(72) Inventor: Fong Lin, Glendale, CA (US)

( * ) Notice: Subject to any disclaimer, the term of this patent is extended or adjusted under 35 U.S.C. 154(b) by 0 days.

(21) Appl. No.: 15/449,806

(22) Filed: Mar. 3, 2017

(65) Prior Publication Data

US 2017/0251685 A1    Sep. 7, 2017

Related U.S. Application Data

(60) Provisional application No. 62/303,581, filed on Mar. 4, 2016.

(51) Int. Cl.
*A23C 9/123* (2006.01)
*A23C 9/12* (2006.01)

(52) U.S. Cl.
CPC ............ *A23C 9/1223* (2013.01); *A23C 9/123* (2013.01)

(58) Field of Classification Search
CPC ............................... A23C 9/1223; A23C 9/123
See application file for complete search history.

(56) References Cited

U.S. PATENT DOCUMENTS

| 3,633,276 | A | * | 1/1972 | Winnie | ................... | A01J 25/115 |
| | | | | | | 99/452 |
| 4,702,162 | A | | 10/1987 | Sontheimer | | |
| 4,902,526 | A | * | 2/1990 | Sudo | ....................... | A23L 27/60 |
| | | | | | | 426/598 |
| 5,904,090 | A | | 5/1999 | Lillelund | | |
| 6,247,393 | B1 | * | 6/2001 | Chang | ................... | A23C 11/103 |
| | | | | | | 366/146 |
| 6,473,988 | B1 | | 11/2002 | Mulhauser | | |
| 6,796,220 | B2 | * | 9/2004 | Lee | ....................... | A23C 11/103 |
| | | | | | | 366/146 |
| D506,903 | S | | 7/2005 | Lee | | |
| 2002/0166578 | A1 | | 11/2002 | Leblond | | |
| 2005/0204935 | A1 | | 11/2005 | Seigel | | |
| 2006/0207441 | A1 | | 11/2006 | Mulhauser | | |
| 2010/0251906 | A1 | | 10/2010 | Repp | | |

FOREIGN PATENT DOCUMENTS

JP    3181043 U    1/2013

OTHER PUBLICATIONS

Derwent Abstract for CN 104585311 published May 2015.*
English Abstract for KR101545961 published Aug. 2015.*
(Continued)

*Primary Examiner* — Anthony Weier
(74) *Attorney, Agent, or Firm* — Knobbe Martens Olson & Bear LLP

(57) ABSTRACT

A device for making Greek yogurt from traditional yogurt is shown. The device includes an outer bowl and an inner strainer that nests within and rotates relative to the outer bowl. At least a portion of the inner strainer is perforated. The device also includes a removable inner lid that that covers and seals the inner strainer when placed thereon. The inner lid rotates with the inner strainer when positioned thereon. The inner lid also includes a first engagement structure for engaging a corresponding second engagement structure of a drive assembly. The device also includes an outer lid that encloses the inner strainer and inner lid within the outer bowl when positioned thereon.

25 Claims, 11 Drawing Sheets

(56) References Cited

OTHER PUBLICATIONS

English Abstract for WO2017007211 published Jan. 2017.*
Derwent Abstract for CN205512022 published Aug. 2016.*
Derwent Abstract for CN102388961 published Mar. 2012.*
OXO Stainless Steel Salad Spinner, http://www.amazon.com/OXO-1071497-Steel-Salad-Spinner/dp/B000ND5C9i/, Date First Accessed: Jan. 15, 2016. Date Printed: Nov. 15, 2017.
Salad Spinner, Container, Server, Cool and Fresh, by Rotho, http://guide.alibaba.com/shop/salad-spinner-container-server-cool-and-fresh-by-rotho_52625410.html; Date First Accessed: Jan. 15, 2016. Date Printed: Nov. 15, 2017.
Good Grips Salad Spinner, https://www.oxo.com/salad-spinner#green, Date First Accessed: Jan. 13, 2016. Date Printed: Nov. 15, 2017.

* cited by examiner

GREEK YOGURT MAKING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57, for example, this application claims priority to U.S. Provisional Patent Application No. 62/303,581, filed Mar. 4, 2016, which is incorporated herein by reference in its entirety and for all purposes.

BACKGROUND

This disclosure relates to devices and methods for removing a liquid from a semi-liquid material. In particular, the devices and methods can be used to make Greek yogurt by removing liquid whey from traditional yogurt.

Greek yogurt, also known as strained yogurt, is typically thicker, richer, and creamier than traditional yogurt and can be made by straining regular yogurt to remove its whey. Although the cost of Greek yogurt is generally higher than that of traditional yogurt, the popularity of Greek yogurt has increased dramatically in recent years.

SUMMARY

Disclosed herein are devices and methods for making Greek yogurt by actively straining whey from traditional yogurt, or, in more general terms, for actively straining liquid from another substance. As used herein, the term "active straining" refers to rotating a strainer to remove liquid from a substance contained within the strainer by centrifugal force. Although this disclosure primarily discusses devices and methods for actively straining whey from traditional yogurt to make Greek yogurt, it is not intended that this disclosure be limited to only that example—the devices and methods described herein may be used to actively strain other liquids from other substances.

In a first aspect, a device for making Greek yogurt is disclosed. The device includes an outer bowl having an upper opening and a pivot extending from an inner surface of the outer bowl. A removable bowl-shaped inner strainer nests within the outer bowl when placed therein. The inner strainer includes an upper opening and is at least partially perforated. The inner strainer is supported within the outer bowl by the pivot such that the inner strainer is rotatable relative to the outer bowl. The device further includes a removable inner lid that covers and provides a liquid impermeable seal for the upper opening of the inner strainer when placed thereon. In some embodiments, the inner lid includes an outer ring-shaped portion that is convex away from the inner strainer and surrounds a central portion that is concave toward the inner strainer. The inner lid also includes a plurality of indentations positioned around the ring-shaped portion. The inner lid rotates with the inner strainer when positioned thereon. That is, rotation of the inner lid causes rotation of the inner strainer, or vice versa. The device also includes a removable outer lid that covers the upper opening of the outer bowl and encloses the inner strainer and inner lid between the outer lid and the outer bowl when placed thereon. The outer lid includes a drive assembly having a hand crank operatively connected to a rotatable plate. The rotatable plate includes a plurality of protrusions configured in size and shape to mate with the plurality of indentations of the inner lid, such that rotation of the hand crank causes rotation of the inner lid and inner strainer.

In some embodiments, the perforated portion of the inner strainer may have a porosity of about 20 microns or less. In some embodiments, the device may include a removable filter lining the inner strainer, and the removable filter may have a porosity of about 20 microns or less. The device may also include a gasket positioned between the upper opening of the inner strainer and the inner lid for creating the liquid impermeable seal. In some embodiments, the pivot supports the inner strainer above a bottom surface of the outer bowl such that a receiving space for whey is created in the outer bowl below the inner strainer. The volume of the receiving space may be approximately one-half the volume of the inner strainer. The inner lid may include a handle. The inner lid may include an opening extending therethrough.

In some embodiments, the drive assembly further includes a large gear connected to the hand crank, such that rotation of the hand crank causes rotation of the large gear, and a small gear fixedly attached to the rotatable plate, the small gear meshed with the large gear. The diameter of the large gear may be larger than the diameter of the small gear such that rotation of the hand crank causes a faster rotation of the rotatable plate. In some embodiments, the hand crank is located on an exterior side of the outer lid and the large gear, the small gear, and the rotatable plate are located on an interior side of the outer lid.

In another aspect, a device for separating liquid from a semi-liquid material is disclosed. The device includes an outer bowl and an inner strainer that nests within and rotates relative to the outer bowl. The inner strainer includes an upper opening and at least a portion of the inner strainer is perforated. The device also includes a removable inner lid that that covers and seals the upper opening of the inner strainer when placed thereon. The inner lid rotates with the inner strainer when positioned thereon. The inner lid includes a first engagement structure for engaging a corresponding second engagement structure of a drive assembly. The device also includes an outer lid that encloses the inner strainer and inner lid within the outer bowl when positioned thereon. The outer lid includes the drive assembly, and the drive assembly is hand operable to cause the rotation of the inner strainer.

In some embodiments, the semi-liquid material is yogurt and the liquid is whey. In some embodiments, the perforated portion of the inner strainer may have a porosity of about 20 microns or less. In some embodiments, the device may include a removable filter lining the inner strainer, and the removable filter may have a porosity of about 20 microns or less.

The inner lid may include an outer ring-shaped portion that is convex away from the inner strainer. The ring-shaped portion may surround a central portion that is concave toward the inner strainer. The lid may further include, for example, a hole extending through the central portion of the inner lid. In some embodiments, an upper surface of the inner lid is substantially flat. The drive assembly may include a mechanism selected from the group consisting of a rotatable crank or handle, a pull cord, a pump button, or an electric motor.

In another aspect, a method for making Greek yogurt is disclosed. The method includes placing yogurt within a hand operable device. The device includes an outer bowl, an inner strainer that nests within and rotates relative to the outer bowl, wherein the yogurt is placed within the inner strainer, an inner lid that that covers and seals the inner strainer when placed thereon, the inner lid rotatable with the inner strainer when positioned thereon, and an outer lid that encloses the inner strainer and inner lid within the outer bowl when positioned thereon, the outer lid including a hand operable drive assembly for causing rotation of the inner strainer. The method also includes covering the inner strainer with the inner lid, wherein the inner lid creates a liquid impermeable barrier between the inner lid and the inner strainer, placing the outer lid on the outer bowl, and straining whey from the yogurt by operating the hand operable drive assembly and causing the inner strainer to rotate.

In some embodiments, the drive assembly may include a rotatable crank or handle, a pull cord, or pump button, and said operating the hand pump includes operating the rotatable crank or handle, the pull cord, the pump button, or the electric motor. The device may also include a receiving space for whey in the outer bowl below the inner strainer, and the method may further include straining whey from the yogurt by operating the hand operable drive assembly until the receiving space is full. The method may also include placing the inner strainer within the outer bowl. In some embodiments, the method also includes preparing yogurt from milk by denaturing the milk by cooking it to approximately 180° F., cooling the milk to approximately 130° F., adding approximately two tablespoons of plain yogurt to the milk, and incubating the milk at approximately 110° F. for approximately seven hours.

In another aspect, an automated device for processing milk into Greek yogurt is disclosed. The device includes an outer bowl having at least one heating element configured to heat contents of the outer bowl and/or inner strainer. An inner strainer nests within the outer bowl. The inner strainer includes an upper opening, and at least a portion of the inner strainer is perforated. The inner strainer is configured to move between a low position, wherein the inner strainer is positioned against an interior surface of the outer bowl, and a high position, wherein the inner strainer is positioned above the interior surface of the outer bowl to create a space therebetween. The device also includes an electric motor mechanically connected to the inner strainer and configured to cause rotation of the inner strainer relative to the outer bowl. The device also includes an inner lid that that covers and seals the upper opening of the inner strainer when placed thereon, the inner lid rotatable with the inner strainer, and an outer lid that encloses the inner strainer and inner lid within the outer bowl when positioned thereon. The device may include an automated starter depositor configured to deposit a starter into the inner strainer. The automated starter depositor may be positioned on a top portion of the outer lid.

In some embodiments, the device further includes, for example, a control system connected to the at least one heating element, the electric motor, and the automated starter depositor. The control system includes a processor configured to: heat, with the at least one heating element, the contents of the outer bowl and/or inner strainer with the inner strainer positioned in the low position; deposit, with the automated starter depositor, a starter into the contents of the outer bowl and/or inner strainer; cause the inner strainer to move from the low position to the high position within the outer bowl; and cause rotation, with the electric motor, of the inner strainer to actively strain a liquid from the contents of the outer bowl. In some embodiments, the controller includes a user interface for programming a particular automated schedule or routine. In some embodiments, the user interface includes a start button configured to start a pre-programed routine.

In some embodiments, the device further includes at least one temperature sensor. An output of the temperature sensor is electrically or mechanically connected to the control system. The processor may further be configured to heat, with the at least one heating element, the contents of the outer bowl to approximately 180° F.; allow the contents of the outer bowl to cool to approximately 130° F.; and deposit, with the automated starter depositor, the starter into the contents of the outer bowl when the contents have cooled to approximately 130° F. In some embodiments, the processor is configured to cause the inner strainer to move from the low position to the high position within the outer bowl and to cause the rotation of the inner strainer approximately seven hours after the automated starter depositor deposits the starter. In some embodiments the inner strainer may be rotated both clockwise or counterclockwise during operation of the device.

In some embodiments, the inner lid includes an opening formed therethrough. In some embodiments, the automated starter depositor is positioned in the outer lid above the opening in the inner lid. In some embodiments, the automated starter depositor is configured to deposit the starter through the opening. In some embodiments, the outer lid includes a rotatable plate having a first engagement structure. In some embodiments, the inner lid includes a second engagement structure. In some embodiments, in the high position, the first engagement structure engages the second engagement structure. In some embodiments, the electric motor is connected to the inner strainer by an output shaft. In some embodiments, the output shaft is configured to extend to move the inner strainer between the low position and the high position. In some embodiments, the device is configured to process milk into Greek yogurt in a substantially automated manner, for example, without requiring user intervention once the process is started.

BRIEF DESCRIPTION OF THE DRAWINGS

The features and advantages of the Greek yogurt making devices and methods described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. The drawings may not be drawn to scale.

DETAILED DESCRIPTION

The following discussion presents detailed descriptions of the several embodiments of Greek yogurt making devices and methods shown in the figures. These embodiments are not intended to be limiting, and modifications, variations, combinations, etc., are possible and within the scope of this disclosure.

Figure 1:
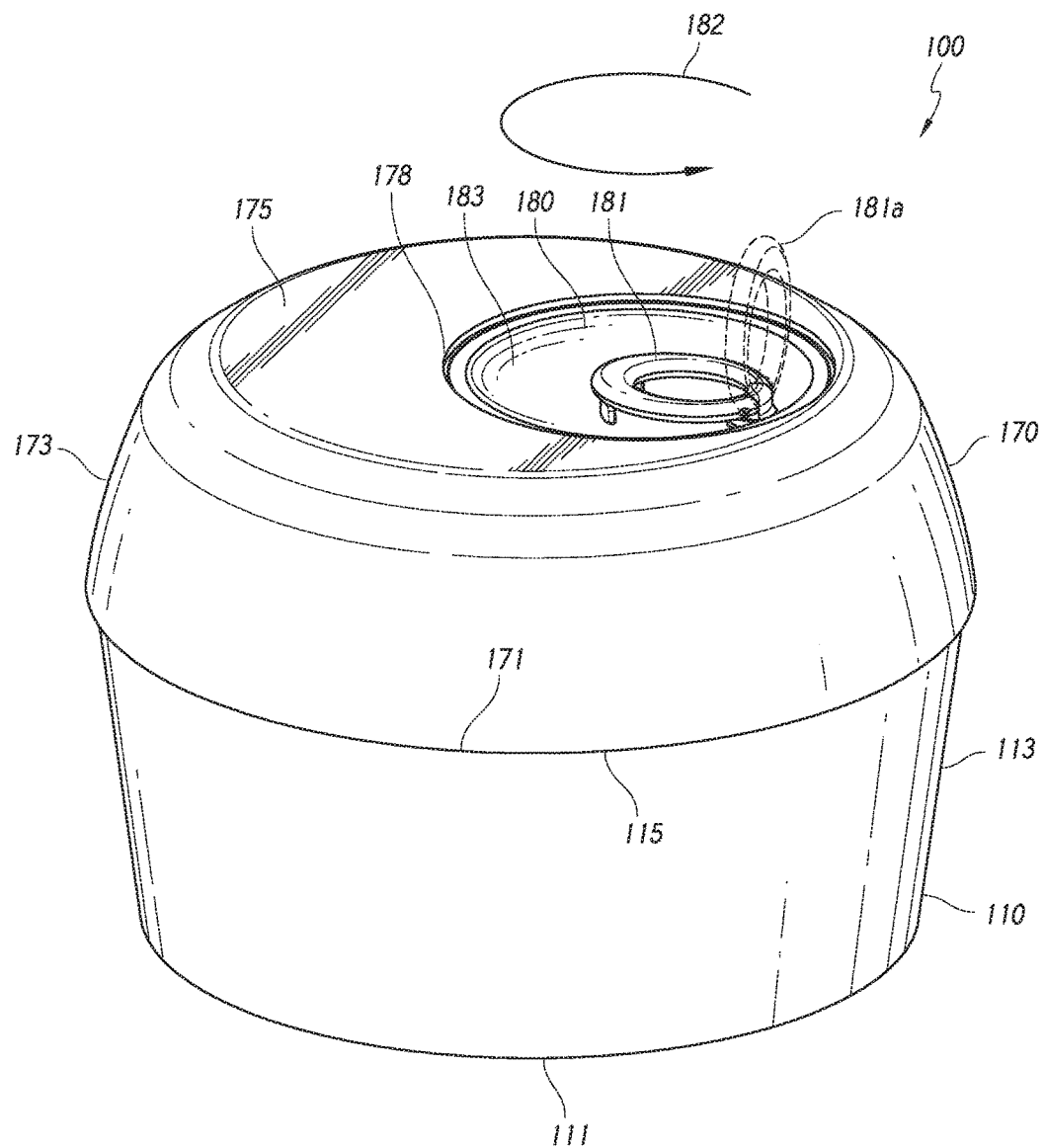
FIG. 1 is a perspective view of one embodiment of a Greek yogurt making device. The device is hand operable to actively strain whey from traditional yogurt to produce Greek yogurt.

FIG. 1 is a perspective view of one embodiment of a Greek yogurt making device 100. As will become apparent from the following description, the device 100 is hand operable to actively strain whey from traditional yogurt to produce Greek yogurt. Although the device 100 is described as a Greek yogurt making device, this is intended as only one example of how the device 100 may be used. In more general terms, the device 100 is useable to actively strain liquid from another substance.

The device 100 includes an outer bowl 110 having a closed base 111, sides 113, and an upper opening 115. The base 111 of the outer bowl 110 may be generally flat to provide a stable foundation for the device 100. In some embodiments, one or more feet may be included on the bottom surface of the base 111. In some embodiments, a small ring shaped flange may extend from the bottom surface of the base 111. The one or more feet, the ring shaped flange, or the bottom surface of the base 111, may include a rubberized texture or other high friction finish to provide added stability for the device 100.

In the illustrated embodiment, the base 111 is substantially circular, and the sides 113 of the outer bowl 110 extend upward from the outer edges of the base 111 to form the outer bowl 110. The sides 113 may intersect with the base 111 at an angle of approximately 90° or more with respect to vertical. In some embodiments, the sides 113 gradually transition into the base 111 by inclusion of a curved portion between the base 111 and the sides 113. The upper edges of the sides 113 define an upper opening 115 in the outer bowl 110. In some embodiments, the upper opening 115 is substantially circular. The diameter of the upper opening 115 may be larger than or equal to the diameter of the base 111. In the illustrated embodiment, the diameter of the upper opening 115 is larger than the diameter of the base 111 and the sides 113 angle outward from the base 111 to the upper opening 115.

The outer bowl 110 may be made from plastic, glass, or any other suitable material. In some embodiments, the outer bowl 110 is transparent. The volume of the outer bowl 110 may be between approximately 0.5 gallons and approximately 10 gallons. However, this range is merely provided by way of example, and larger or smaller outer bowls may be used. In some embodiments, the volume of the outer bowl is less than 5 gallons, less than 4 gallons, less than 3 gallons, less than 2 gallons, less than 1.5 gallons, less than 1 gallon, less than 0.75 gallons, or less than 0.5 gallons. In one embodiment, the volume of the outer bowl 110 is approximately 1.7 gallons.

The device 100 also includes a removable outer lid 170. In the assembled state, the outer lid 170 is placed on the outer bowl 110. A lower edge 171 of the outer lid 170 is configured to correspond and mate with the upper opening 115 of the outer bowl 110. Thus, in the assembled state, the outer lid 170 covers the outer bowl 110. In the illustrated embodiment, the sides 173 of the outer lid 170 extend upward from the lower edge 171 of the outer lid 170 and intersect with an upper surface 175. The sides 173 may extend upward from the lower edge 171 at an angle of approximately 90° or less with respect to vertical and may angle toward the center axis of the device 100. In the illustrated embodiment, the upper surface 175 is substantially flat, although this need not be the case in all embodiments. In some embodiments, the sides 173 may be curved or may gradually transition into the upper surface 175 by inclusion of a curved portion between the sides 173 and the upper surface 175. Thus, in some embodiments, the upper lid 175 may be shaped as an inverted bowl.

Figure 2:
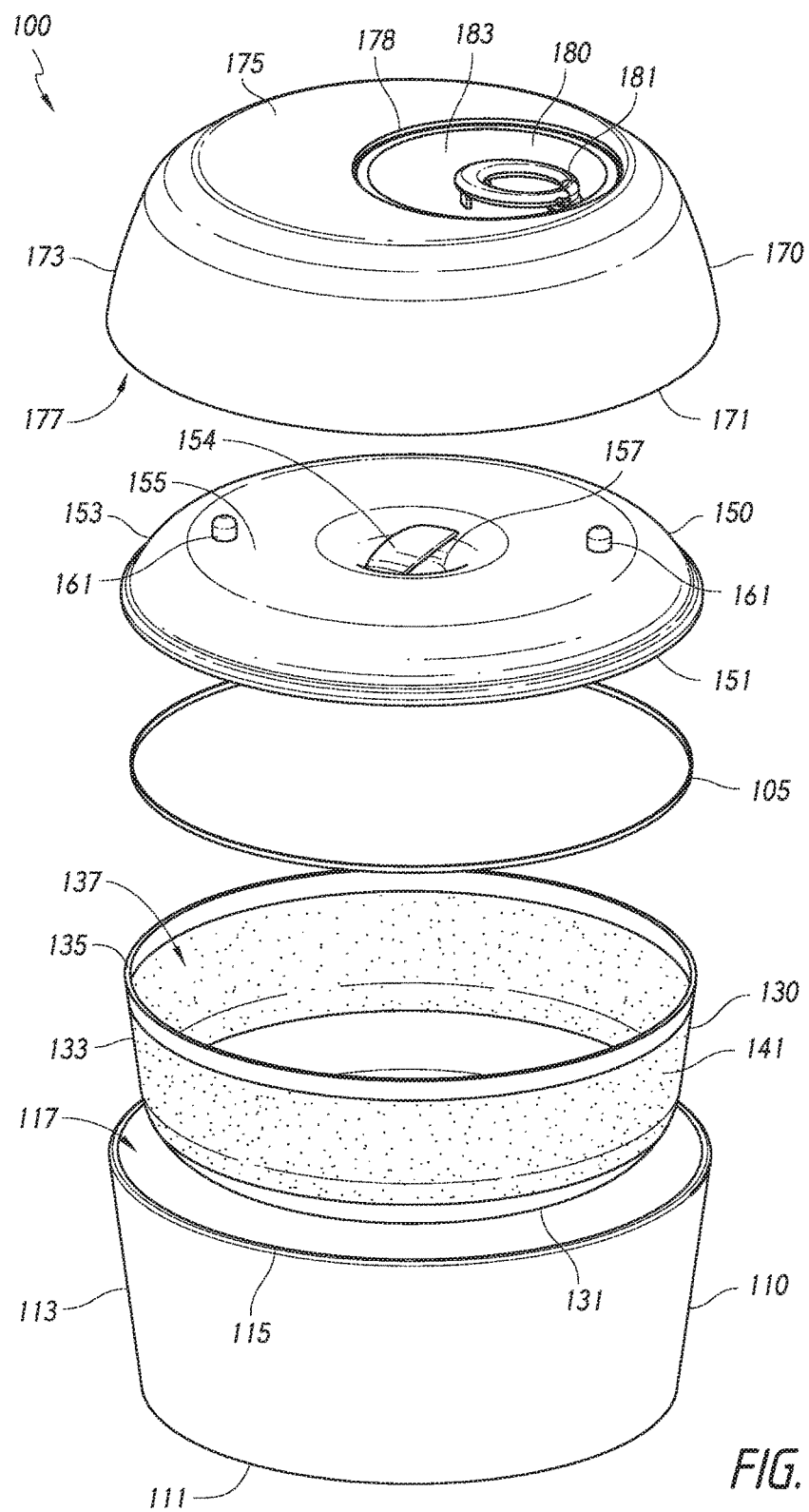
FIG. 2 is a partially exploded view of the Greek yogurt making device of FIG. 1 and shows the outer bowl, the inner strainer, the inner lid, and the outer lid including the drive assembly.
Figure 5A:
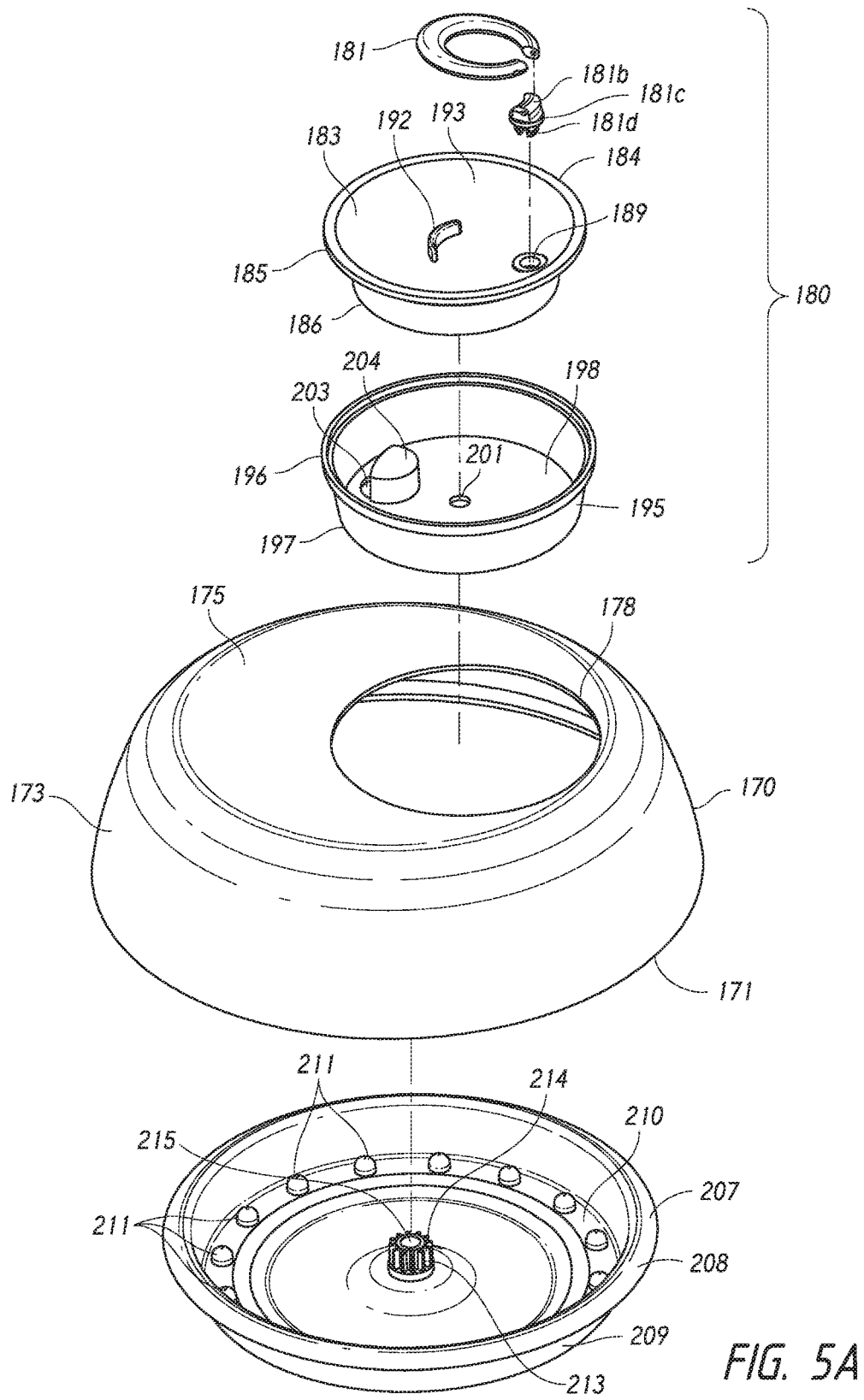
FIG. 5A is a top perspective exploded view of an embodiment of an outer lid and drive assembly of the Greek yogurt making device of FIG. 1.
Figure 6:
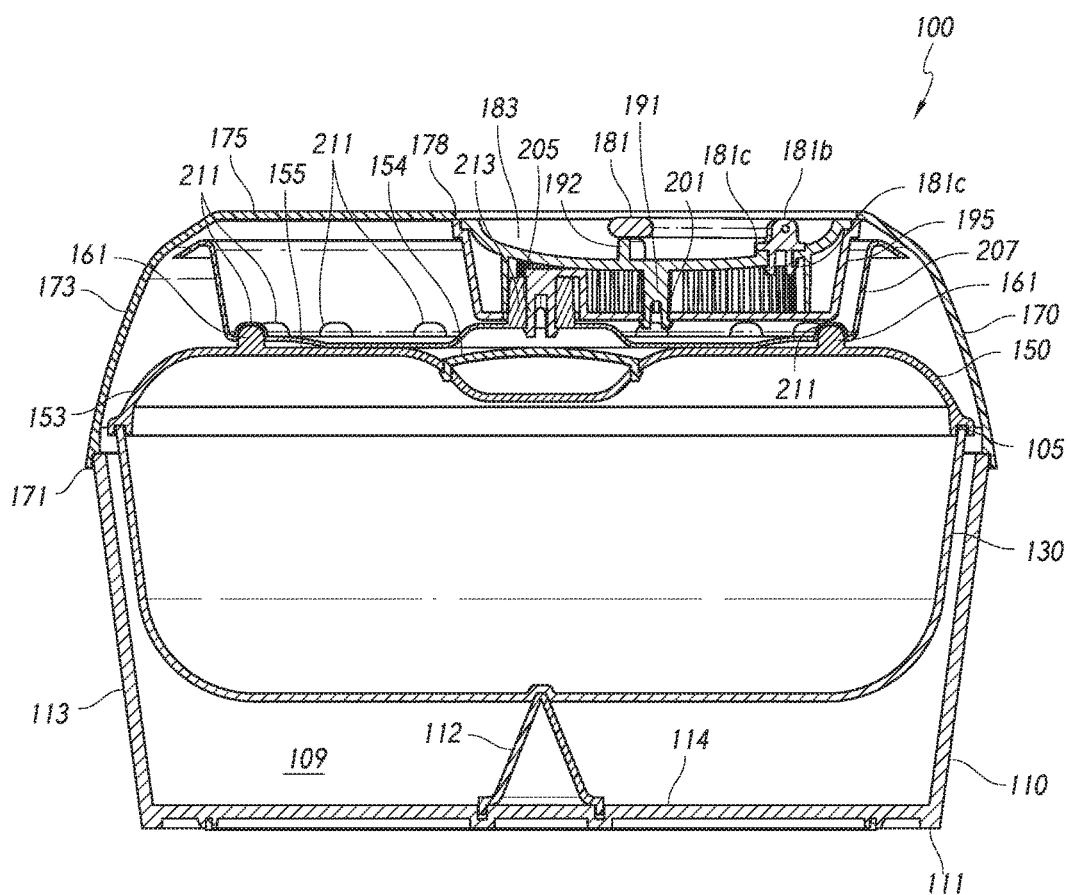
FIG. 6 shows a cross-sectional view of the Greek yogurt making device of FIG. 1, illustrated in an assembled state.

As shown in FIGS. 2 and 6, in the assembled state, the outer bowl 110 and the outer lid 170 enclose an inner strainer 130 and an inner lid 150. The lid 170 includes a hand operable drive assembly (shown in the exploded view of FIG. 5A) that is configured to impart rotational motion to the inner strainer 130 and inner lid 150. As will be described in greater detail below, yogurt may be placed within the inner strainer 130, which is then covered with the inner lid 150. The drive assembly is then used to cause the inner strainer 130 and the inner lid 150 to rotate. As the inner strainer 130 rotates, the inner strainer 130 actively strains the whey from the yogurt by centrifugal force. The whey is forced through the inner strainer 130 and is collected in the outer bowl 110. The strained yogurt remains in the inner strainer 130, now as Greek yogurt. The inner lid 150 ensures that the yogurt is contained within the inner strainer 130, by preventing it from creeping up and over the sides of the inner strainer 130 during rotation.

Returning to FIG. 1, a portion of the drive assembly for imparting rotational motion to the inner strainer 130 and inner lid 150 is shown. The outer lid 170 includes a hand crank 180. The hand crank 180 includes a handle 181 attached to a rotatable first gear 183. The first gear 183 is rotatably positioned within an opening 178 in the upper surface 175 of the outer lid 170. In the illustrated embodiment, the handle 181 can selectively be positioned in a flat position for storage, and an erect position for use. The handle 181a is shown in the erect position using dashed lines. The hand crank 180 is operable by rotating the handle 181a in the direction of the arrow 182. Rotation can be either clockwise or counterclockwise. As will be discussed in greater detail below, rotation of the hand crank 180 imparts rotational motion to the inner strainer 130 and the inner lid 150 and enables the device to actively strain whey from yogurt to make Greek yogurt.

The outer lid 170 may be made from plastic, glass, or any other suitable material. In some embodiments, the outer lid 170 is transparent. In the assembled state, the device 100 may have an overall height of approximately 36 inches or less and an overall diameter of approximately 24 inches or less. In one embodiment, the overall height is about 8 inches and the overall diameter is about 11.5 inches. The device 100 may be configured to be lightweight and portable. The device 100 may be suitable for countertop or tabletop use.

FIG. 2 is a partially exploded view of the Greek yogurt making device 100 of FIG. 1 and shows the outer bowl 110, the inner strainer 130, the inner lid 150, and the outer lid 170. The outer bowl 110 includes the closed base 111, sides 113, and upper opening 115 as described above. The outer bowl 110 defines an interior space 117 into which the inner strainer 130 rotatably nests. As shown in the cross-sectional view of FIG. 6, the outer bowl 110 may include a pivot 112 extending from an interior surface 114 of the outer bowl 110. In the assembled state, the inner strainer 130 is supported within the outer bowl 110 by the pivot 112.

The inner strainer 130 may be substantially bowl-shaped. A bottom surface 131 of the inner strainer 130 may be substantially flat, as in the illustrated embodiment, although in some embodiments the bottom surface may not be substantially flat. For example, in some embodiments, the bottom surface 131 of the inner strainer 130 may include a curved shape. In some embodiment, the bottom surface 131 is substantially circular and the sides 133 of the inner strainer 130 extend upward from the outer edges of the bottom surface 131. The sides 133 may intersect with the bottom surface 131 at an angle of approximately 90° or more with respect to vertical. In some embodiments, the sides 133 gradually transition into the bottom surface 133 by inclusion of a curved portion between the bottom surface 131 and the sides 133. The upper edges of the sides 133 define an upper opening 135 in the inner strainer 130. In some embodiments, the upper opening 135 is substantially circular. The diameter of the upper opening 135 may be larger than or equal to the diameter of the bottom surface 131. In the illustrated embodiment, the diameter of the upper opening 125 is larger than the diameter of the bottom surface 131, and the sides 133 angle outward from the bottom surface 131 to the upper opening 135. The inner strainer 130 thus defines an interior space 137. The material to be actively strained, for example, the yogurt, is placed within the interior space 137 of the inner strainer 130.

The strainer 130 includes a perforated portion 141. In the illustrated embodiment, the perforated portion 141 is formed on the sides 133 of the inner strainer 130. In some embodiments, the perforated portion 141 may also extend, partially or entirely, onto the bottom surface 131 of the inner strainer 130. The perforated portion 141 is configured to allow liquid (such as whey) to pass therethrough, while prohibiting passage of non-liquid or semi-liquid (such as yogurt) materials. In some embodiments, the perforated portion 141 is formed as a fine mesh with a porosity of approximately 20 microns or less. In some embodiments, the body of the inner strainer 130 is perforated with small holes such that the perforated portion 141 has a porosity of approximately 20 microns or less. In some embodiments, the body of the inner strainer 130 and/or the perforated portion 141 are together or separately made from stainless steel, plastic or any other suitable material. In general, a suitable material may be easily cleanable, safe for processing foods, and/or able to be manufactured with a porosity of approximately 20 microns or less.

Figure 3:
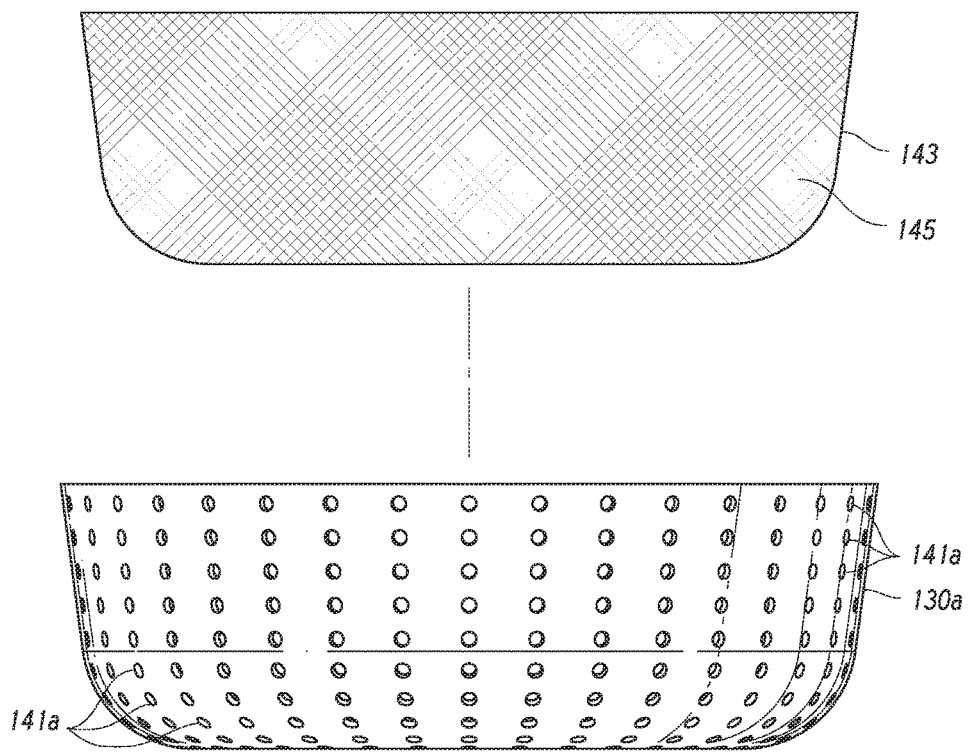
FIG. 3 shows an additional embodiment of an inner strainer that is used with an insertable filter.

FIG. 3 shows an additional embodiment of an inner strainer 130a that may be used with some embodiments of the device 100. The inner strainer 130a is configured for use with an insertable filter 143. The inner strainer 130a may include the same general bowl-shape as inner strainer 130 described above. However, the perforated portion of inner strainer 130a includes larger perforations 141a. The larger perforations 141a may be formed as holes extending through the body of the inner strainer 130a. In some embodiments, the holes may have a diameter of between approximately 0.01 and 0.5 inches, although smaller and larger diameters are possible. In other embodiments, the perforations 141a may include other shapes, for example slits, webbing, netting, mesh, etc. In contrast with the perforated portion 141 of the inner strainer 130 described above, the larger perforations 141a of the inner strainer 130a need not be impermeable to solid or semi-liquid materials. Instead, the inner strainer 130a is used in combination with an insertable filter 143. The insertable filter 143 may be configured in size and shape to line the interior of the inner strainer 130a. In some embodiments, the insertable filter 143 may be shaped to follow the contours of the interior of the inner strainer 130a. In some embodiments, the insertable filter 143 may be a flat flexible sheet, which contours to the shape of the inner strainer 130a when inserted. In some embodiments, the insertable filter 143 may be made of paper (for example, similar to a coffee filter), cloth (for example, cheesecloth), or any other suitable material (for example, a fine mesh). In some embodiments, the insertable filter 143 includes a porous region 145 with a porosity of approximately 20 microns or less. In some embodiments, the porous region 145 may be formed on the entirety of the insertable filter 143. In some embodiments, the insertable filter 143 may be disposable. In some embodiments, the insertable filter 143 may be reusable.

Returning to FIG. 2, the device 100 also includes an inner lid 150. In general, the inner lid 150 is configured in size and shape to cover the upper opening 135 of the inner strainer 130. Accordingly, the peripheral edge 151 of the inner lid 150 may be configured with a diameter that corresponds to the diameter of the upper opening 135 of the inner strainer 130. In the illustrated embodiment, sides 153 curve up and away from the peripheral edge 151 and toward the center of the inner lid 150. The sides 153 intersect with an upper surface 155. In some embodiments, the upper surface 155 may be substantially flat. In some embodiments, the sides 153 may be omitted and the upper surface 155 may extend directly from the peripheral edge 151.

One or more protrusions 161 may be formed on the upper surface 155 of the inner lid 150. In the illustrated embodiment, the inner lid 150 includes two protrusions 161. The protrusions 161 may be configured in size and shape to engage with corresponding structure of the drive assembly, as discussed below. This interaction between the drive assembly and the inner lid 150 is used to transfer rotational motion from the drive assembly to the inner lid 150. Other engagement structures may also be used. For example, the inner lid 150 may include one or more indentations that correspond and engage with one or more protrusions in the drive system. In some embodiments, a surface of the drive assembly may transfer rotational motion to the inner lid 150 via planar contact and friction. Engagement between the peripheral edge 151 of the inner lid 150 and the upper opening 135 of the inner strainer 130 transfers rotational motion between the inner lid 150 and the inner strainer 130. That is, in the assembled state (with the inner lid 150 placed on the inner strainer 130), the inner lid 150 and the inner strainer 130 rotate together and rotation of one causes equal and direct rotation of the other. In some embodiments, the drive assembly may act on the inner strainer 130 and the inner strainer 130 may cause the inner lid 150 to rotate.

In the illustrated embodiment, the upper surface 155 curves back down at the center to form a concave central portion 157. In the illustrated embodiment, therefore, the inner lid 150 includes an outer ring-shaped portion, formed by sides 153 and upper surface 155 that is convex away from the inner strainer 130. The ring-shaped portion surrounds the concave center portion 157 that is concave toward the inner strainer 130. Thus, the shape of the inner lid 150 may be described as that of an inverted Bundt cake or frusto-toroidal, in some embodiments.

Figure 4A:
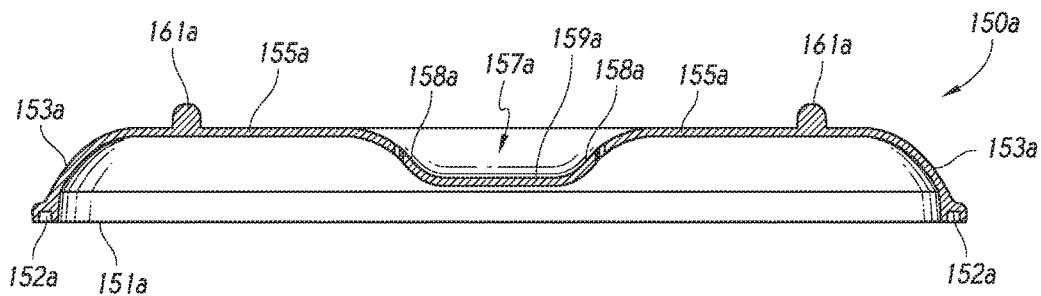
FIGS. 4A, 4B, 4C, and 4D show cross-sectional views of various embodiments of inner lids that can be used with the Greek yogurt making devices described herein.

FIGS. 4A-4D show cross-sectional views of various embodiments of inner lids 150a, 150b, 150c, 150d that can be used with the Greek yogurt making devices 100 described herein. FIG. 4A shows a cross-sectional view of an inner lid 150a that is substantially similar to the inner lid 150 discussed above. The inner lid 150a includes a peripheral edge 151a that engages the upper opening 135 of the inner strainer 130. The peripheral edge 151a may include a groove 152a. In some embodiments, the groove 152a creates a receiving space into which the edges of the upper opening 135 of the inner strainer 130 are received. In some embodiments, a gasket 105 (see FIG. 2) is positioned within the groove 152a. The profile shape of the inner lid 150a is shown in FIG. 4A. The profile includes sides 153a that curve up and away from the peripheral edge 151a and toward the center of the inner lid 150a, upper surface 155a, and concave central portion 157a. In the illustrated embodiment, the concave central portion 157a is formed with outer side surfaces 158a that curve back down toward the inner strainer 130 and connect to a flat surface 159a. In some embodiments, the flat surface 159a and the outer side surfaces 158 can form a pointed or rounded cone shape at the center of the inner lid 150a. The protrusions 161a are also shown in FIG. 4A.

Figure 4B:
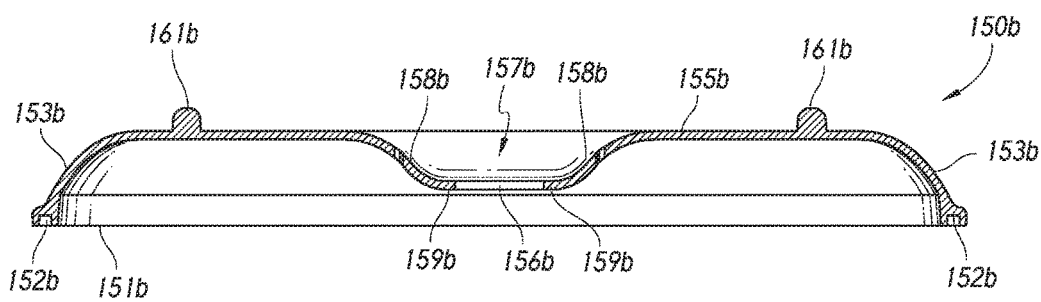

FIG. 4B shows another embodiment of an inner lid 150b. Similarly numbered elements are substantially similar to previously described elements of a previous figure and description of these elements will not be repeated. For example, peripheral edge 151b is substantially similar to the previously described peripheral edge 151a. Inner lid 150b includes a hole 156b extending through the flat surface 159b of the concave center portion 157b. The hole 156b may be aligned with a central axis of the inner lid 150b. In some embodiments, the hole 156b may extend beyond that flat surface 159b and include portions of the side surfaces 158b. In some embodiments, the diameter of the hole 156b may be between approximately 5% and 50% of the overall diameter of the inner lid 150b, although larger and smaller diameters are possible. The inner lid 150b may be described as donut shaped, having a curved outer ring surrounding a central hole 156b.

Figure 4C:
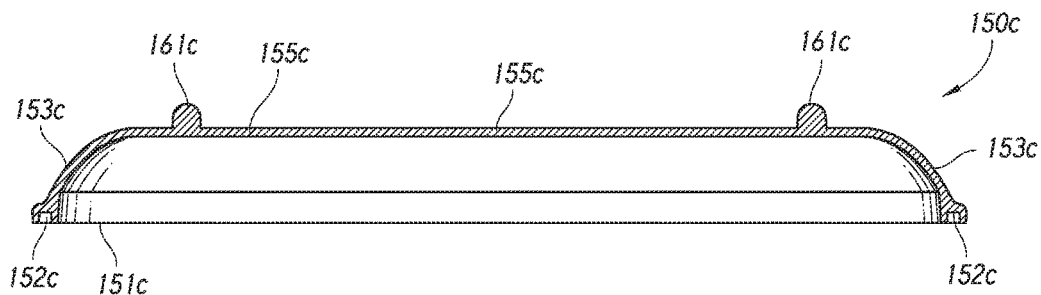
Figure 4D:
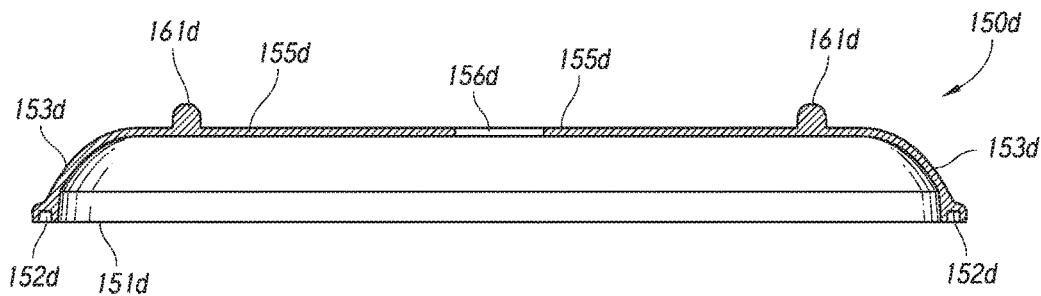

FIG. 4C illustrates an additional embodiment of an inner lid 150c. Similarly numbered elements are substantially similar to previously described elements of a previous figure. In contrast with the previously described embodiments, the inner lid 150c does not include a concave central portion. Rather, the upper surface 155c extends entirely across the upper lid 150c. In some embodiments, the upper surface 155c extends entirely across the upper lid 150c and connects directly the peripheral edge 151c. Accordingly, in some embodiments, the upper lid 150c may be substantially flat. FIG. 4D shows an embodiment of an inner lid 150d that is similar to the inner lid 150c. However, the inner lid 150d includes a hole 156d extending therethrough. The hole 156d may be aligned with a central axis of the inner lid 150d. In some embodiments, the diameter of the hole 156d may be between approximately 5% and 50% of the overall diameter of the inner lid 150d, although larger and smaller diameters are possible.

Modifications of the embodiments the inner lids 150a, 150b, 150c, 150d of FIGS. 4A-4D, as well as other embodiments, will be apparent to one of ordinary skill in the art based on the disclosure provided herein and are all considered within the scope of the this disclosure. For example, any of the shapes described as curved, could be embodied using straight features.

Returning again to FIG. 2, in some embodiments, the device 100 may include a gasket 105 that is positioned between the inner strainer 130 and the inner lid 150. In some embodiments, the gasket 105 is attached to the peripheral edge 151 of the inner lid 150, while in other embodiments the gasket 105 is attached to the edge of the upper opening 135 of the inner strainer 130. In some embodiments, the gasket 105 is fixedly attached, and, in some embodiments, the gasket 105 is removably attached. The gasket 105 may be formed of rubber or any other suitable material. The gasket 105 may be used to seal the joint between inner strainer 130 and the inner lid 150. In some embodiments, the gasket 105 may be omitted, and the fit between the inner strainer 130 and the inner lid 150 provides the seal between these components. In some embodiments, the seal is liquid impermeable. In some embodiments, the seal is semi-liquid impermeable (for example, impermeable to yogurt).

In the assembled state, the inner strainer 130 nests within the outer bowl 110 and the inner lid 150 is placed on the inner strainer 130. The outer lid 170 is then placed on the outer bowl 110. The inner strainer 130 and inner lid 150 are thus enclosed within the outer bowl 110 and the outer lid 170. The drive assembly contained within the outer lid 170 engages the protrusions 161 of the inner lid 150, and operation of the hand crank 180 imparts rotational motion to the inner lid 150 and the inner strainer 130. The rotation of the inner strainer 130 causes the whey of yogurt placed within the inner strainer 130 to be actively strained through the perforated portion 141 of the inner strainer 130. The whey collects in the outer bowl 110. The rotational motion of the inner strainer 130 also causes the yogurt within the inner strainer 130 to move up the interior surfaces of the sides 133 of the inner strainer 130. However, the inner lid 150 and the seal between the inner lid 150 and the inner strainer 130 prevent the yogurt from being expelled from the inner strainer 130.

FIG. 5A is a top perspective exploded view of an embodiment of the outer lid 170 and drive assembly of the Greek yogurt making device 100 of FIG. 1. Although the illustrated embodiments show the drive assembly as a hand crank and gears, the device 100 is not intended to be limited thereto. Other types of drive assemblies are possible and within the scope of this disclosure. For example, in some embodiments, the drive assembly may include a pull cord assembly or a pump button assembly for generating rotational motion. In some embodiments, the drive assembly may include an electric motor. In some embodiments, the drive assembly may be integrated with another component of the device 100, such as the outer bowl 110.

The drive assembly shown in FIG. 5A includes a hand crank 180 for generating rotational motion that is imparted to the inner strainer 130. The hand crank 180 includes a handle 181 that is connected to a first gear 183 by a connector 181c. The connector 181c may include a protrusion 181b for connecting to the handle 181. As shown in FIG. 1, the handle 181 is pivotally connected to the connector 181c such that it can pivot between the position shown in solid lines in FIG. 1 and the position shown in dashed lines in FIG. 1. The connector 181c may also include a snap-fit shaft 181d that connects to a hole 189 in the first gear 183. The snap-fit shaft 181d may include two compliant arms that are tipped with prongs. The compliant arms deflect inward to allow the prongs to pass through the hole 189, and then after having been passed through the hole 189 the compliant arms extend to lock the connector 181c in place. In some embodiments, a stopper/lock (not shown) can be inserted between the two compliant arms to lock the snap-fit shaft 181d in place. The stopper/lock can be inserted between the compliant arms after they have been inserted through the hole 189. The stopper/lock prevents the compliant arms from deflecting towards each other. The snap-fit shaft 181d is fitted within the hole 189 (as shown in FIG. 6) so that it can freely rotate. Thus, the handle 181 is able to rotate (twist) relative to the first gear 183. This may allow a user to hold the handle 181 in a constant orientation while using the handle 181 to rotate the first gear 183.

Figure 5B:
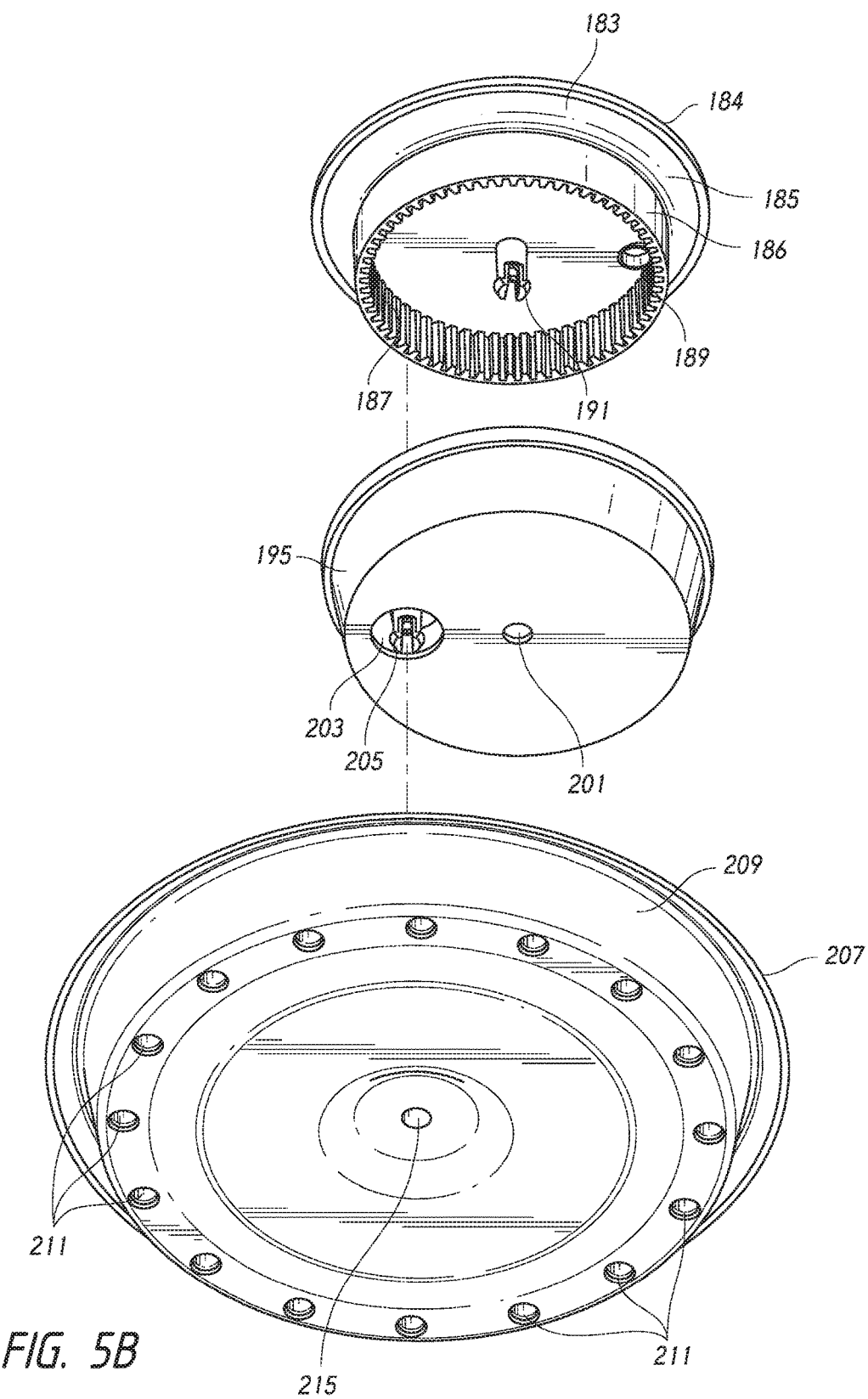
FIG. 5B shows bottom perspective views of a first gear, a first gear base pan, and a rotatable plate.

Top and bottom perspective views of the first gear 183 are shown in FIGS. 5A and 5B, respectively. The first gear 183 includes an upper surface 193. In the illustrated embodiment, the upper surface 193 is recessed. A handle rest 192 extends from the upper surface 193 and supports the handle 181 when the handle 181 is lying flat. The hole 189 is formed through the upper surface 193 of the first gear 183. The hole 189 is generally positioned toward the periphery of the upper surface 193 so as to increase the moment arm for imparting rotational motion. The first gear 183 also includes a peripheral flange 184 extending around the outer edge of the upper surface 193. As shown in the bottom perspective view of FIG. 5B, a bottom surface 185 of the first gear 183 includes a curved portion that follows the contours of the recessed upper surface 193. A cylindrical flange 186 extends downwardly from the bottom surface 185. An interior surface of the cylindrical flange 186 includes gear teeth 187. A snap-fit shaft 191 extends from the bottom surface 185 of the first gear 183. The snap-fit shaft 191 is aligned with a central axis of the first gear 183, and the first gear 183 rotates around the snap-fit shaft 191. The snap-fit shaft 191 is used to connect the first gear 183 to a hole 201 in a first gear base pan 195. The snap-fit shaft 191 may include two compliant arms that are tipped with prongs. The compliant arms deflect inward to allow the prongs to pass through the hole 201, and then extend to lock the first gear 183 in place. In the assembled position, the snap-fit shaft 191 is fitted within the hole 201 (as shown in FIG. 6) so that it can freely rotate. As above, the snap-fit shaft 191 may be secured with a stopper/lock.

Figure 5C:
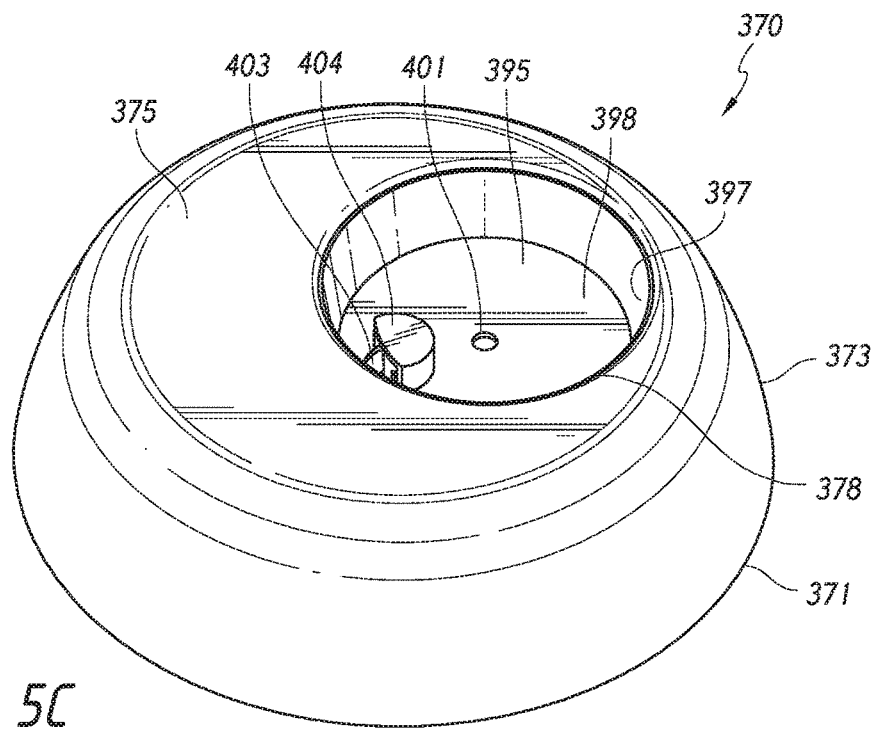
FIG. 5C shows a top perspective view of an embodiment of an outer lid that includes an integrally molded first gear base pan.
Figure 5D:
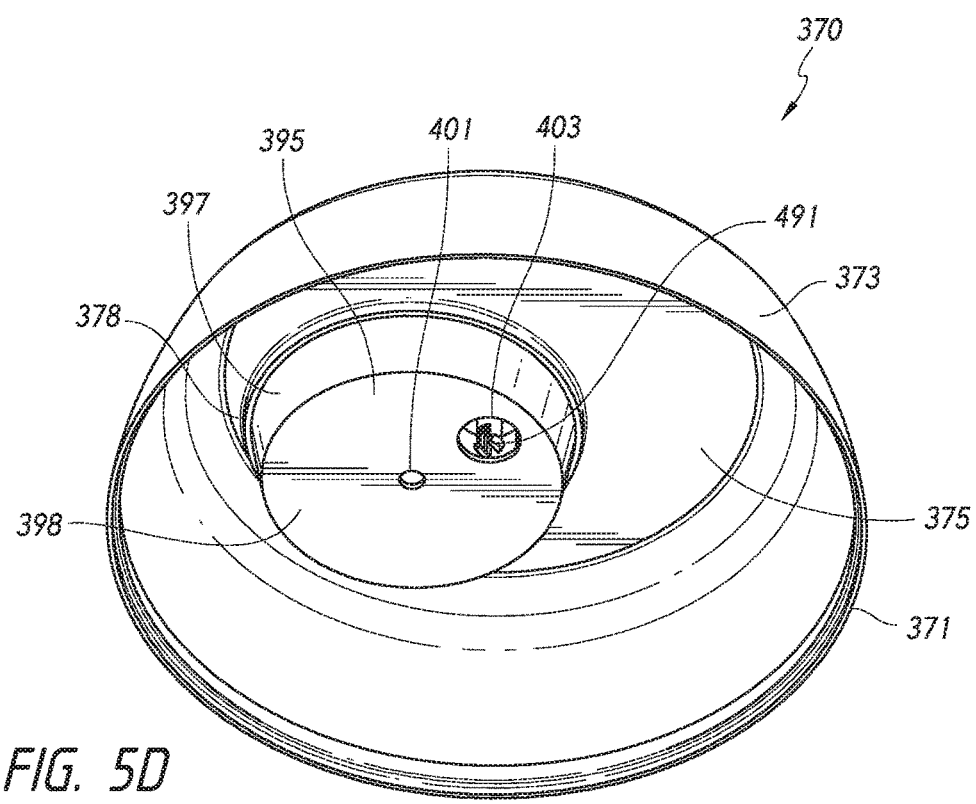
FIG. 5D shows a bottom perspective view of the outer lid of FIG. 5C.

The first gear 183 is received within the first gear base pan 195. The first gear base pan 195 includes a peripheral lip 196, sides 197, and a bottom surface 198. The hole 201 extends through the bottom surface 198 and is aligned with a central axis of the first gear base pan 195. In the assembled position, the first gear base pan 195 is received within the opening 178 in the lid 170 (as shown in FIG. 6). In some embodiments, the first gear base pan 195 is integrally molded together with the outer lid 170, for example, as shown in FIGS. 5C and 5D described below. The opening 178 is off center on the lid 170 but overlaps the central axis of the lid 170. An opening 203 extends through the bottom surface 198 of the first gear base pan 195 and is positioned to align with the central axis of the lid 170 when the first gear base pan 195 is received within opening 178 of the lid. The opening 203 is sized to allow a second gear 213 of a rotatable plate 207 to extend freely therethrough. A cover 204 extends from the bottom surface 198 of the first gear base pan 195 and at least partially over the opening 203. A snap-fit shaft 205 (see FIG. 5B) extends downward from the cover 204 through the opening 203. The snap-fit shaft 205 is used to connect the rotatable plate 207 to the drive assembly.

In some embodiments, the snap-fit shaft 205 may be secured with a stopper/lock as described above.

As described previously, the outer lid 170 includes the lower edge 171, the sides 173, and the upper surface 175, and is formed in an inverted bowl shape. The rotatable plate 207 is received below and within the interior of the outer lid 170. The rotatable plate 207 may include a peripheral flange 208 that is connected to sides 209, which may extend downwardly from the peripheral flange 207. The sides 209 intersect with a bottom surface 210 of the rotatable plate 207. The bottom surface 210 may be substantially flat. The second gear 213 extends upwardly from the top of the bottom surface 210 and is aligned with the central axis of the rotatable plate 207. The second gear 213 includes gear teeth 214 configured to mesh with gear teeth 187 of the first gear 183. In some embodiments, the first gear 183 is a larger gear than the second gear 213. This causes the rotatable plate 207 to rotate with a higher rate of rotation than that imparted to the first gear 183 by the hand crank 180. The second gear 213 includes a hole 215 extending therethrough. The hole 215 is configured to receive the snap-fit shaft 205 of the first gear base pan 195, and secures the rotatable plate 207 to the drive assembly as shown in FIG. 6. The hole 215 is sized so that the rotatable plate 207 can rotate freely on the snap-fit shaft 205. As shown in the bottom perspective view of FIG. 5B, in the illustrated embodiment, sixteen indentations 211 extend through the bottom surface 210. The indentations 211 may be positioned in a circle. The indentations 211 are sized and positioned to mate with the protrusions 161 of the inner lid 150, as shown in FIG. 6. In some embodiments, the number of indentations 211 is equal to the number of protrusions 161. In some embodiments, the number of indentations 211 is greater than the number of protrusions 161. In some embodiments, the protrusions 161 and the indentations 211 may be reversed. That is, the inner lid 150 may include indentations and the rotatable plate 207 can include protrusions. In some embodiments, other engagement structures between the rotatable plate 207 and the inner lid 150 may be used.

In the assembled position, as shown in the cross-sectional view of FIG. 6, the drive assembly operates to impart rotation motion to the inner lid 150 and inner strainer 130. A user rotates the handle 181 in the direction of the arrow 182 shown in FIG. 1, causing the first gear 183 to rotate. The first gear 183 is meshed with the second gear 213. Thus, rotation of the first gear 183 causes rotation of the second gear 213 and the attached rotatable plate 207. The indentations 211 of the rotatable plate 207 are engaged with the protrusions 161 of the inner lid 150. Thus, the rotation of the rotatable plate 207 is imparted to the inner lid 150. The inner lid 150 is positioned on the inner strainer 130. Accordingly, the rotation of the inner lid 150 causes the rotation of the inner strainer 130. And, as previously discussed, the rotation of the inner strainer 130 causes the active straining of whey from yogurt enclosed within the inner strainer 130. The whey is collected in the outer bowl 110. This embodiment of the drive assembly is provided by way of example only. As previously noted, variations of this drive assembly, or other types of drive assemblies (for example, pull cord, pump button, or electric) are possible and within the scope of this disclosure.

FIG. 5C shows a top perspective view of an embodiment of an outer lid 370 that includes an integrally molded first gear base pan 395. FIG. 5D shows a bottom perspective view of the outer lid 370 of FIG. 5C. In some embodiments of the Greek yogurt making device 100, the single-piece outer lid 370 may be used in place of the separate outer lid 170 and first gear base pan 195 described above. In some embodiments, the outer lid 370 is formed as an integrally molded piece. In some embodiments, the outer lid 370 may be molded in separate pieces that are later joined, for example, by adhesives.

The outer lid 370 may be formed in the shape of an inverted bowl. The outer lid 370 includes a lower edge 371 that is configured to correspond and mate with the upper opening 115 of the outer bowl 110. Thus, the outer lid 370 covers the outer bowl 110 in the assembled state. Sides 373 of the outer lid 370 extend upward from the lower edge 371 of the outer lid 370 and intersect with an upper surface 375. In the illustrated embodiment, the upper surface 375 is substantially flat, although this need not be the case in all embodiments. In some embodiments, the sides 373 may be curved or may gradually transition into the upper surface 375 by inclusion of a curved portion between the sides 373 and the upper surface 375.

The upper surface 375 includes a recessed portion, referred to herein as the first gear base pan 395. The first gear base pan 395 may be configured in size and shape to receive the first gear 183. The first gear base pan 395 is formed as an opening 378 in the upper surface 376. Sides 398, integrally connected with the upper surface 375, extend downwardly from the opening 378 to a bottom surface 398. A hole 401 extends through the bottom surface 398 and is aligned with a central axis of the first gear base pan 395. The first gear base pan 395 is off center on the upper surface 375 but overlaps the central axis of the lid 370. An opening 403 extends through the bottom surface 398 of the first gear base pan 395 and is positioned to align with the central axis of the lid 370. The opening 403 is sized to allow the second gear 213 of a rotatable plate 207 to extend freely therethrough. A cover 404 extends from the bottom surface 398 of the first gear base pan 395 and at least partially over the opening 403. A snap-fit shaft 491 (see FIG. 5D) extends downwardly from the cover 404 through the opening 403. The snap-fit shaft 491 is used to connect the rotatable plate 207 to the drive assembly. In some embodiments, the snap-fit shaft 491 may be secured with a stopper/lock as described above.

FIG. 6 shows a cross-sectional view of the Greek yogurt making device 100 of FIG. 1 shown in an assembled state. As shown, the inner strainer 130 is received within the outer bowl 110. The inner strainer 130 is supported by the pivot 112, which extends from an inner surface 114 of the outer bowl 110. The pivot 112 may be aligned with the central axis of the outer bowl 110 and the inner strainer 130. The pivot 112 supports the inner strainer 130 about the inner surface 114 of the outer bowl 114 such that a receiving space 109 for whey is created within the outer bowl 110 below the inner strainer 130. The volume of the receiving space 109 may be configured to correspond to the amount of whey strained while making one batch of Greek yogurt. For example, when making Greek yogurt from bovine milk, roughly one-half of the milk will be strained out as whey. Thus, in some embodiments, the volume of the receiving space 109 is configured to be one-half the volume of the initial unstrained material. In some embodiments, the volume of the receiving space 109 is configured to be at least one-half the volume of the inner strainer 130. In some embodiments, the volume of the receiving space is approximately one-half the volume of the inner strainer. Although the pivot 112 is illustrated as a conical shape, other shapes are possible.

FIG. 6 further illustrates how the various components of the drive assembly interact in the assembled position. The handle 181 is connected to the first gear 183 via connector 181c. The first gear 183 is connected via snap-fit shaft 191 to the first gear base pan 195 and also meshes with the second gear 213 of the rotatable plate 207. The rotatable plate 207 is rotatably connected to the first gear base pan 195 via the snap-fit shaft 205. The indentations 211 of the rotatable plate engage the protrusions 161 of the inner lid 150.

Figure 7:
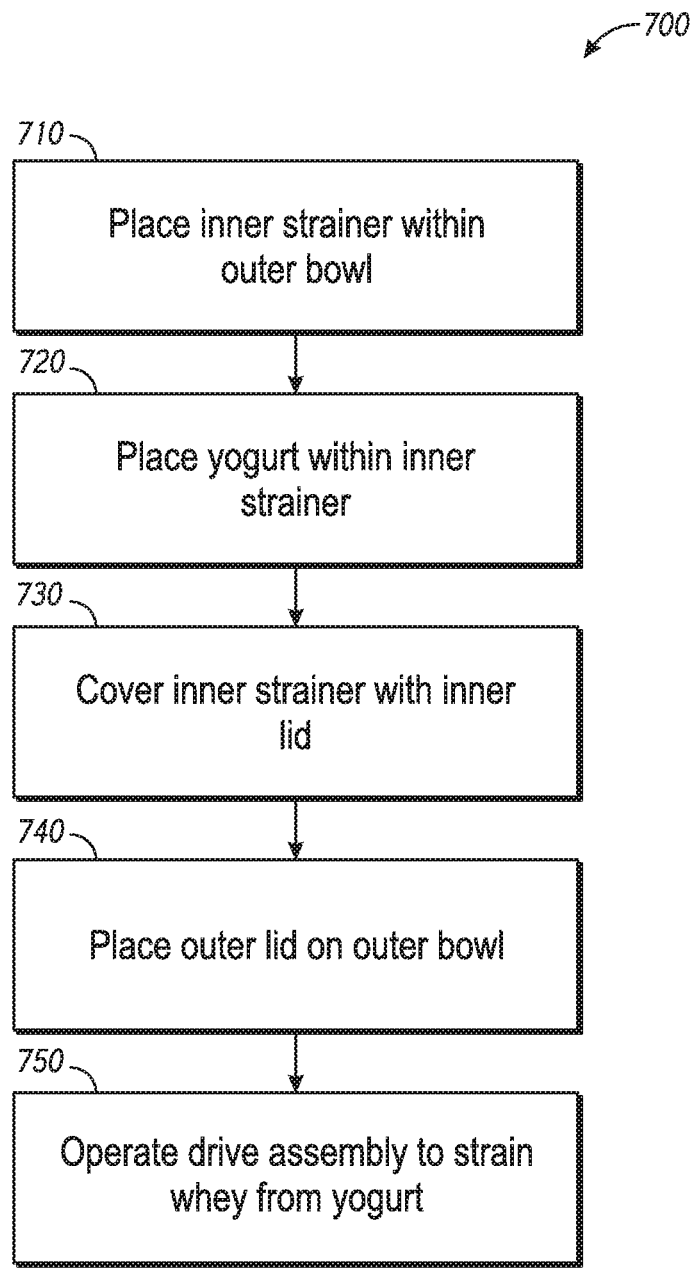
FIG. 7 is a flowchart illustrating an example method for making Greek yogurt using the Greek yogurt making device of FIG. 1.

FIG. 7 is a flowchart illustrating an example method 700 for making Greek yogurt using the Greek yogurt making device 100 of FIG. 1. The method 700 begins at block 710 where a user places the inner strainer 130 within the outer bowl 110 of the device 100. At block 720, the user places traditional yogurt in the inner strainer. This yogurt can either be purchased, or the user can make the yogurt from milk. To make yogurt from milk, the user can denature the milk by cooking or heating it to approximately 180° F., cool the milk to approximately 130° F., add starter, for example, approximately two tablespoons of plain yogurt to the milk, and incubate the milk at approximately 110° F. for approximately seven hours. However, these specific temperature and time-frame parameters are provided by way of example only, and may be varied as would be appreciated by one of skill in the art informed by the disclosure of the present application. Further, other substances beyond plain yogurt can be added to the milk as a starter, including, for example, whey from a previous batch, among others. This yogurt can then be added to the inner strainer 130. At block 730, the user covers the inner strainer 130 with the inner lid 730. At block 740, the user places the outer lid 170 on the outer bowl 110. Finally, at block 750 the user operates the drive assembly of the device 100 to actively strain the whey from the yogurt. The user can continue to operate the drive assembly until the yogurt achieves the desired consistency. In some embodiments, the user can continue to operate the drive assembly until the receiving space in the outer bowl 110 is full of whey. This can serve as an indicator that processing the yogurt into Greek yogurt is complete.

Figure 8:
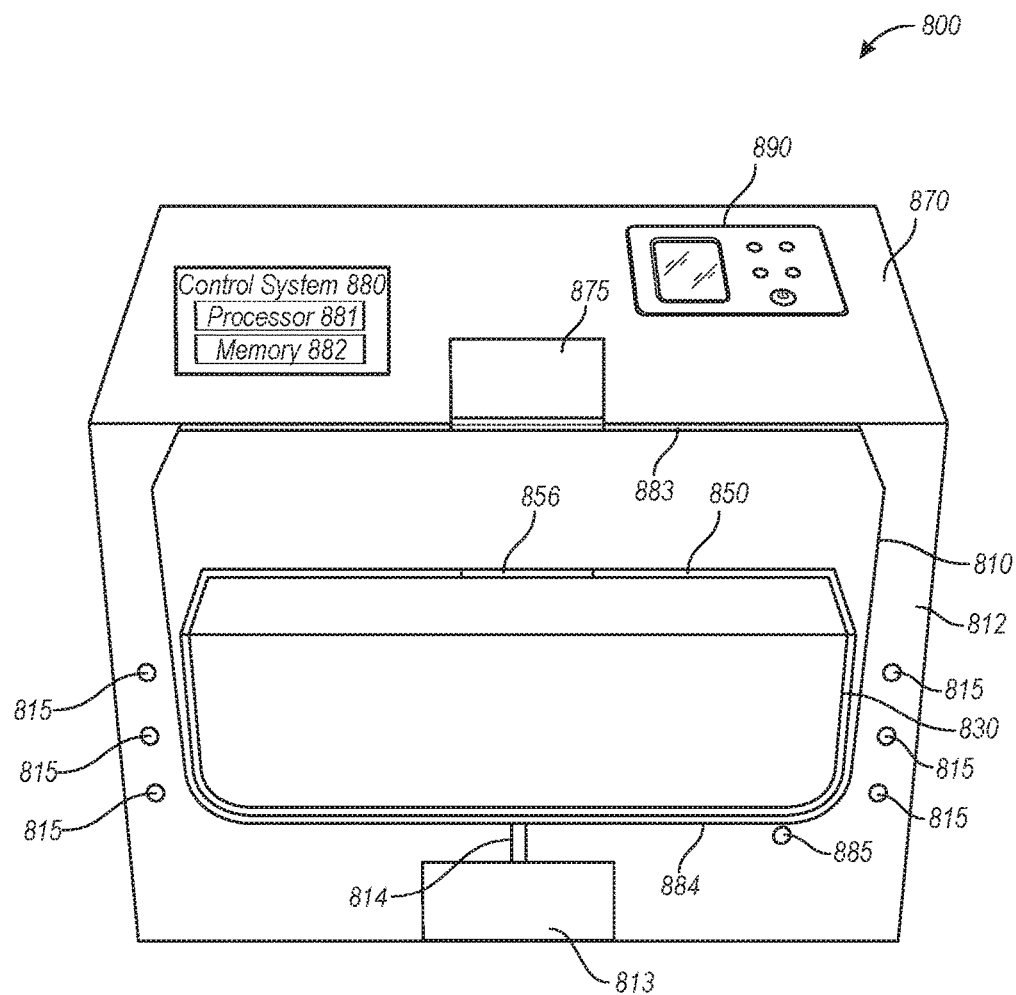
FIG. 8 shows an embodiment of an automated device for making Greek yogurt. The automated device can be used to process milk into yogurt and includes a motor for causing rotation that actively strains the whey through an inner strainer.

FIG. 8 shows an embodiment of an automated device 800 for making Greek yogurt (or actively straining a liquid from another material). The device 800 can be used, for example, to process regular milk into Greek yogurt using an automated process (that might not, for example, require user input/interaction once started). The device 800 includes an outer bowl 810 and an outer lid 870, which enclose an inner strainer 830 and an inner lid 850 similar to features described previously with reference to the device 100. The inner strainer 850 may be configured with a perforated portion for straining whey from yogurt that is similar to the perforated portion 141 of the inner strainer 130 described above. In some embodiments, the perforated portion of the inner strainer 840 has a porosity that is about twenty microns or less. In some embodiments, the inner strainer 830 may work with an insertable filter as described above (such as insertable filter 143). The inner lid 850 covers and seals the inner strainer 830 in a similar manner as the inner lid 150 covers and seals the inner strainer 130 described above, and prevents yogurt from exiting the inner strainer 830 during rotation.

The device 800 includes heating elements 815 for heating the milk as part of the automated process. The heating elements 815 may be disposed within or surrounding the outer bowl 810. In some embodiments, the heating elements 815 include resistive heating elements made of metals, ceramics, polymers, composites, or any other suitable materials. In some embodiment, other types of heating elements are used. In some embodiments, the heating elements 815 are in close proximity to the inner surface 884 of the outer bowl 810 so as to transfer heat to the contents of the device

800. For example, in some embodiments, the heating elements 815 are within 1 mm, 3 mm, 5 mm, 7 mm, 9 mm, or 1 cm of the inner surface 884 of the outer bowl 810, although other distances are possible. In some embodiments, the heating elements 815 are positioned around the sides and/or bottom surfaces of the inner surface 884 of the outer bowl 810. In some embodiments, one or more heating elements 815 are positioned within the outer lid 870. The heating elements 815 may be connected to a control system 880 of the device 800, which is discussed in greater detail below. In some embodiments, the exterior of the outer bowl 810 includes an insulative layer. The insulative layer can prevent or limit the exterior of the outer bowl 810 from becoming dangerously hot (e.g., to prevent burning a user) and can also help ensure that the heat generated by the heating elements 815 is transferred to the contents of the device 800. The outer lid 870 can also include an insulative layer.

As discussed above, milk can be processed into yogurt by, for example, denaturing the milk by cooking it to approximately 180° F., cooling the milk to approximately 130° F., adding a small amount (for example, two tablespoons) of a starter (such as plain yogurt) to the milk, and incubating the milk at approximately 110° F. for approximately seven hours. The heating elements 815 can be used to heat the milk during each of these steps.

In some embodiments, the device 800 includes one or more temperature sensors 885 for measuring the temperature of the contents of the device 800. The temperature sensor 885 can be in contact with the inner surface 884 of the outer bowl 810 as shown, although other locations for the temperature sensor 885 are also possible (for example, within the outer lid 870). In some embodiments, the temperature sensor 885 is a thermistor, a resistance temperature detector (RTD), a thermocouple, a semi-conductor based temperature sensor, or any other type of temperature sensor. The temperature sensor 885 can be connected to the control system 880. The output of the temperature sensor 885 may be used by the control system 880 to control the heating elements 815.

The device 800 includes an automated starter depositor 875. In some embodiments, the automated starter depositor 875 is located in the outer lid 870 as shown. In some embodiments, the automated starter depositor 875 is located in the outer bowl 810. In some embodiments, the automated starter depositor is located on the inner lid 850. The automated starter depositor is configured to deposit the starter (for example, the two tablespoons of plain yogurt) into the milk at the appropriate time in the process. The starter can be previously loaded into the automated starter depositor 875, for example, at the beginning of the processing cycle. In some embodiments, the automated starter depositor 875 includes a compartment configured to hold the starter and a door (for example, a trap door in the bottom of the compartment) configured to open at the designated step in the process to deposit the starter. In some embodiments, the automated yogurt depositor is a rotatable compartment having an opening. The starter can be loaded into the compartment through the opening. In a first position, the opening may face upwardly, such that the starter is contained within the compartment. The compartment can rotate to a second position, in which the opening faces downwardly to deposit the starter. In some embodiments, the automated starter depositor 875 is positioned above an opening 856 in the inner lid 850, such that the starter can fall through the opening 856 when deposited. The automated starter depositor 875 can be connected to the control system 880 such that the control system 880 can control the automated starter depositor 875 as described below. In some embodiments, the automated starter depositor 875 is omitted and the device 800 can include a timer and an alert that signals the user when the starter should be added.

The inner strainer 830 is operatively coupled to an electric motor 813 to cause rotation of the inner strainer 830. In the illustrated embodiment, the inner strainer 830 is directly connected to the electric motor 813 via an output shaft 814. In some embodiments, the inner strainer 830 is indirectly connected to the electric motor 813 via one or more gears and or belts. The electric motor 813 is connected to the control system 880 such that the control system 880 can control the electric motor 813. The device 800 can also include one or more electric motor controllers (not shown). In some embodiments, the electric motor 813 is positioned in the outer bowl 810 (for example, below an inner surface of the outer bowl 810 as shown). In some embodiments, the electric motor 813 is positioned within the outer lid 810. In some embodiments, the electric motor 813 is configured to cause the inner strainer 830 to rotate at least 60 rpm, 100 rpm, 150 rpm, 200 rpm, 250 rpm, 300 rpm, 350 rpm, 400 rpm, 500 rpm, or faster. In some embodiments, the electric motor 813 has variable speed control.

In some embodiments of the device 800, the inner strainer 830 is configured to move between a low position and a high position within the outer bowl 810. In the low position (as illustrated in FIG. 8), the inner strainer 830 fits closely against the inner surface 884 of the outer bowl 810. In the high position, the inner strainer 830 is raised above the inner surface 884 of the outer bowl 810. In some embodiments, the output shaft 814 is configured to move the inner strainer 830 between the low position, where the inner strainer 830 nests tightly with the inner surface 884 of the outer bowl 810, and the high position, where the inner strainer 830 is elevated above the inner surface 885 of the outer bowl 810. In some embodiments, the electric motor 813 is mounted on a moveable platform within the outer bowl 810. The moveable platform can raise and lower the electric motor 813 and the output shaft 814 to raise and lower the inner strainer 830. Other methods for raising and lowering the inner strainer 830 within the outer bowl 810 are also possible. For example, the inner strainer 830 can be lifted from above (for example, from the outer lid 870). In some embodiments, the inner strainer 830 is positioned in the low position while the liquid milk is processed into yogurt and is positioned in the high position during rotation of the inner strainer 830 for processing the yogurt into Greek yogurt. With the inner strainer 830 in the low position, the liquid milk is retained within the inner strainer 830 by the outer bowl 810. In the high position, a receiving space is created in the outer bowl 810 below the inner strainer 830 to receive liquid (e.g., whey) strained from a semi-liquid (e.g., yogurt) in the inner strainer 830.

In some embodiments, in the high position, the inner lid 850 engages with a structure on the outer lid 870 to support the inner lid 850 and inner strainer 830 during rotation. For example, in the illustrated embodiment, the outer lid 870 includes a rotatable plate 883 positioned on a bottom inner portion of the outer lid 870. The rotatable plate 883 may be similar to the rotatable plate 207 discussed above. The rotatable plate 883 can include engagement features (e.g., depressions, recesses, slots, grooves, etc.) that can engage with corresponding engagement features on the inner lid 850. The rotatable plate 883 can rotate freely relative to the rest of the inner lid 870 such it can rotate with the inner lid 850 and inner strainer 830. In some embodiments, engagement of the inner lid 850 and the inner strainer 830 stabilizes the inner strainer 830 and inner lid 850 during rotation. In some embodiments, the electric motor 813 is positioned within the outer lid 870 and connected to the rotatable plate 883. The electric motor 813 can cause rotation of the rotatable plate 883 which can be transferred to the inner lid 850 and inner strainer 830 via the engagement described above. In some embodiments, the rotatable plate 883 is omitted.

The device 800 may also include various controls 890 that allow the user to operate the device 800. The controls 890 can be connected to the control system 880. In some embodiments, the device 800 may include a one-touch operation mode. The one-touch operation mode may allow a user to load ingredients (for example, milk and two tablespoons of plain yogurt) into the device and then press a single button to process the milk into Greek yogurt without requiring any further input from the user. The controls 890 may allow a user to select different temperature, incubation and/or straining settings that correspond to the type of milk (or other material) being processed and/or the desired resulting product. For example, yogurt can be made from soy, goat or sheep's milk, which too can be strained into Greek yogurt, and the device can include control to fine tune the process for each. Although illustrated on the outer lid 870, the controls 890 can also be positioned on the outer bowl 810.

As previously mentioned, the device 800 includes a control system 880. The control system 800 is connected to the controls 890, the heating elements 815, the temperature sensor 885, the electric motor 813, and the automated starter depositor 875 so as to control the operation of the device 800. In the illustrated embodiment, the control system 880 includes a processor 881 and a memory 882. The memory 882 can store instructions that configured the processor 881 to operate the device 800 in an automated manner. For example, in some embodiments, the memory 882 includes instructions that configured the processor 881 to perform one or more of the steps of the method 900 described below. Although illustrated in the outer lid 870, the control system 880 can also be positioned in the outer bowl 810. In some embodiments, the control system 880 includes a user interface. In some embodiments, the user interface includes a start button.

Figure 9:
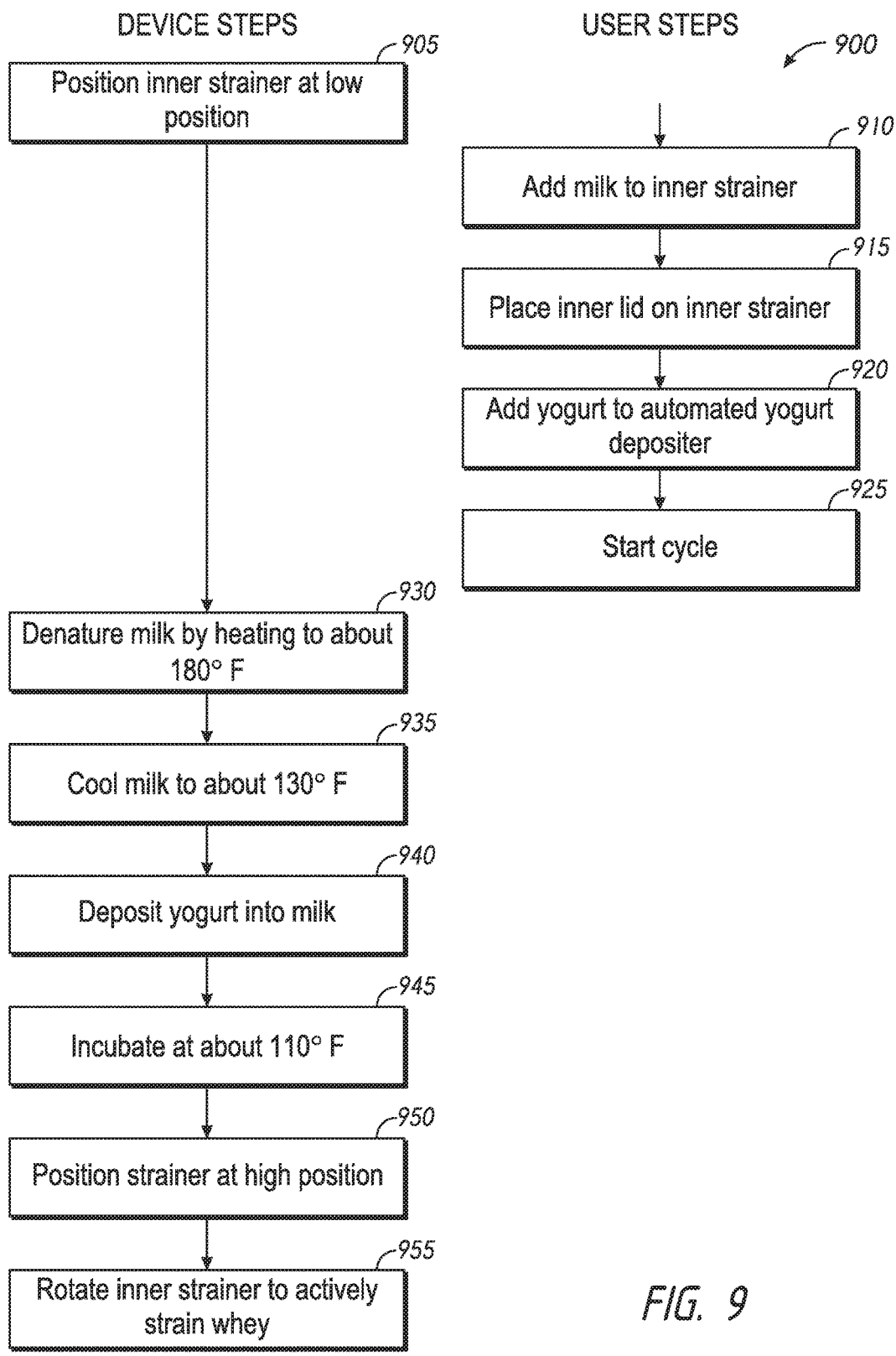
FIG. 9 is a flowchart illustrating an example method for making Greek yogurt using the Greek yogurt making device of FIG. 8.

FIG. 9 is a flowchart illustrating an example method 900 for making Greek yogurt using the automated Greek yogurt making device 800 of FIG. 8. The blocks of the method 900 are illustrated in two columns: a first column of blocks that are performed by the device 800, and a second column of blocks performed by the user. The method 900 begins at block 905, where the device 800 positions the inner strainer 830 at the low position. At block 910, the user adds milk to the inner strainer 830. At block 915, the user places the inner lid 850 on the inner strainer 830. At block 920, the user adds a starter (such as two tablespoons of plain yogurt) to the automated starter depositor 875. At block 925, the user places the outer lid 870 on the outer bowl 810 and begins the cycle by selecting the processing procedure using the controls 890.

At block 930, the device 800 denatures the milk by cooking it to approximately 180° F. using the heating elements 815. At block 935, the device 800 cools the milk to approximately 130° F. In some embodiments, cooling the milk involves passive cooling, for example, by turning off the heating elements 815. At block 940, the device 800 adds the starter to the milk with the automated starter depositor 875 at the appropriate time (for example, when the milk has cooled to approximately 130° F.). At block 945, the device 800 incubates the milk at approximately 110° F. for approximately seven hours 800. At block 950, the device transitions the inner strainer 830 to the high position by raising the inner strainer 830. At this point in the cycle, the liquid milk has been cultured into yogurt and is now a semi-liquid that will remain in the inner strainer 830. Raising the inner strainer 830 to the high position creates a receiving space for whey below the inner strainer 830 in the outer bowl 810. Finally, at block 955, the device 800 rotates the inner strainer 830 using the electric motor 813 to actively strain the yogurt into Greek yogurt. In some embodiments, the device 800 may cause rotation of the inner strainer 830 for predetermined period of time. In some embodiments, the device 800 may include a sensor in the outer bowl 810 for measuring the whey strained from the yogurt. The device 800 may cause rotation of the inner strainer until a fixed quantity of whey (as measured by the sensor) is strained from the yogurt. Accordingly, the device 800 is used to automatically process milk into Greek yogurt. In some embodiments, the rotation steps are omitted, and the device 800 is used to make regular (non-Greek) yogurt.

The Greek yogurt making devices described throughout this application may be configured in a wide variety of sizes. As several non-limiting examples, a Greek yogurt making device may be configured for batch sizes of between one-half gallon and five gallons, although other sizes are also possible.

Further, as noted previously, the Greek yogurt making devices described herein may be used for other purposes, and the description of the devices as "Greek yogurt making" devices is merely provided as one example of a potential use. As several additional non-limiting examples, the devices may be used for making cheese (straining out whey), making soy milk (straining out soy pulp), making tofu (straining for curds), making potato latke (straining out water), or making juice (straining the juice from the blended pulp and fiber). In general terms, the device may be used in any application that requires separating a liquid from another substance, such as a semiliquid or solid.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. An automated device for processing milk into Greek yogurt, the device comprising:
    an outer bowl including at least one heating element configured to heat contents of the outer bowl;
    an inner strainer that nests within the outer bowl, the inner strainer including an upper opening and at least a portion of the inner strainer being perforated, the inner strainer configured to move, during processing, between a low position, wherein the inner strainer is positioned against an interior surface of the outer bowl, and a high position, wherein the inner strainer is positioned above the interior surface of the outer bowl to create a space therebetween;
    an electric motor connected to the inner strainer and configured to cause rotation of the inner strainer relative to the outer bowl when the inner strainer is in the high position;
    an inner lid that that covers and seals the upper opening of the inner strainer when placed thereon, the inner lid rotatable with the inner strainer; and
    an outer lid that encloses the inner strainer and inner lid within the outer bowl when positioned thereon.

2. An automated device for processing milk into Greek yogurt, the device comprising:
    an outer bowl including at least one heating element configured to heat contents of the outer bowl;
    an inner strainer that nests within the outer bowl, the inner strainer including an upper opening and at least a portion of the inner strainer being perforated, the inner strainer configured to move, during processing, between a low position, wherein the inner strainer is positioned against an interior surface of the outer bowl, and a high position, wherein the inner strainer is positioned above the interior surface of the outer bowl to create a space therebetween;
    an electric motor connected to the inner strainer and configured to cause rotation of the inner strainer relative to the outer bowl when the inner strainer is in the high position;
    an inner lid that that covers and seals the upper opening of the inner strainer when placed thereon, the inner lid rotatable with the inner strainer;
    an outer lid that encloses the inner strainer and inner lid within the outer bowl when positioned thereon; and
    an automated starter depositor configured to deposit a starter into the inner strainer.

3. The device of claim 2, further comprising a control system connected to the at least one heating element, the electric motor, and the automated starter depositor, the control system including a processor configured to:
    heat, with the at least one heating element, the contents of the outer bowl and/or inner strainer with the inner strainer positioned in the low position;
    deposit, with the automated starter depositor, a starter into the contents of the outer bowl;
    cause the inner strainer to move from the low position to the high position within the outer bowl; and
    cause rotation, with the electric motor, of the inner strainer to actively strain a liquid from the contents of the outer bowl.

4. The device of claim 3, further comprising at least one temperature sensor, an output of the temperature sensor connected to the control system, and wherein the processor is configured to:
    heat, with the at least one heating element, the contents of the outer bowl to approximately 180° F.;
    allow the contents of the outer bowl to cool to approximately 130° F.; and
    deposit, with the automated starter depositor, the starter into the contents of the outer bowl when the contents have cooled to approximately 130° F.

5. The device of claim 4, wherein the processor is configured to cause the inner strainer to move from the low position to the high position within the outer bowl and to cause the rotation of the inner strainer approximately seven hours after the automated starter depositor deposits the starter.

6. The device of claim 2, wherein the inner lid includes an opening formed therethrough, wherein the automated starter depositor is positioned in the outer lid above the opening in the inner lid, and wherein the automated starter depositor is configured to deposit the starter through the opening.

7. The device of claim 2, wherein the outer lid includes a rotatable plate having a first engagement structure, wherein the inner lid includes a second engagement structure, and wherein, in the high position of the inner strainer, the first engagement structure engages the second engagement structure.

8. An automated device for processing milk into Greek yogurt, the device comprising:
    an outer bowl including at least one heating element configured to heat contents of the outer bowl;
    an inner strainer that nests within the outer bowl, the inner strainer including an upper opening and at least a portion of the inner strainer being perforated;
    an electric motor connected to the inner strainer and configured to cause rotation of the inner strainer relative to the outer bowl, wherein the electric motor is connected to the inner strainer by an output shaft, and wherein the output shaft is configured to extend to move the inner strainer between a low position, wherein the inner strainer is positioned against an interior surface of the outer bowl, and a high position, wherein the inner strainer is positioned above the interior surface of the outer bowl to create a space therebetween;
    an inner lid that that covers and seals the upper opening of the inner strainer when placed thereon, the inner lid rotatable with the inner strainer; and
    an outer lid that encloses the inner strainer and inner lid within the outer bowl when positioned thereon.

9. The device of claim 2, wherein the outer lid includes a rotatable plate having a first engagement structure, wherein the inner lid includes a second engagement structure, and wherein, in the high position, the first engagement structure engages the second engagement structure.

10. The device of claim 2, wherein the perforated portion of the inner strainer has a porosity of about 20 microns or less.

11. The device of claim 2, further comprising a removable filter lining the inner strainer, the removable filter having a porosity of about 20 microns or less.

12. The device of claim 2, further comprising a gasket positioned between the upper opening of the inner strainer and the inner lid for creating a liquid impermeable seal.

13. The device of claim 2, wherein the inner lid includes an outer ring-shaped portion that is convex away from the inner strainer, the ring-shaped portion surrounding a central portion that is concave toward the inner strainer.

14. The device of claim 13, further comprising a hole extending through the central portion of the inner lid.

15. The device of claim 2, wherein the electric motor is connected to the inner strainer by an output shaft, and wherein the output shaft is configured to extend to move the inner strainer between the low position and the high position.

16. The device of claim 8, further comprising a control system connected to the at least one heating element, the electric motor, and the automated starter depositor, the control system including a processor configured to:
    heat, with the at least one heating element, the contents of the outer bowl and/or inner strainer with the inner strainer positioned in the low position;
    deposit, with the automated starter depositor, a starter into the contents of the outer bowl;
    cause the inner strainer to move from the low position to the high position within the outer bowl; and
    cause rotation, with the electric motor, of the inner strainer to actively strain a liquid from the contents of the outer bowl.

17. The device of claim 16, further comprising at least one temperature sensor, an output of the temperature sensor connected to the control system, and wherein the processor is configured to:
    heat, with the at least one heating element, the contents of the outer bowl to approximately 180° F.;
    allow the contents of the outer bowl to cool to approximately 130° F.; and
    deposit, with the automated starter depositor, the starter into the contents of the outer bowl when the contents have cooled to approximately 130° F.

18. The device of claim 17, wherein the processor is configured to cause the inner strainer to move from the low position to the high position within the outer bowl and to cause the rotation of the inner strainer approximately seven hours after the automated starter depositor deposits the starter.

19. The device of claim 8, wherein the inner lid includes an opening formed therethrough, wherein the automated starter depositor is positioned in the outer lid above the opening in the inner lid, and wherein the automated starter depositor is configured to deposit the starter through the opening.

20. The device of claim 8, wherein the outer lid includes a rotatable plate having a first engagement structure, wherein the inner lid includes a second engagement structure, and wherein, in the high position of the inner strainer, the first engagement structure engages the second engagement structure.

21. The device of claim 8, wherein the perforated portion of the inner strainer has a porosity of about 20 microns or less.

22. The device of claim 8, further comprising a removable filter lining the inner strainer, the removable filter having a porosity of about 20 microns or less.

23. The device of claim 8, further comprising a gasket positioned between the upper opening of the inner strainer and the inner lid for creating a liquid impermeable seal.

24. The device of claim 8, wherein the inner lid includes an outer ring-shaped portion that is convex away from the inner strainer, the ring-shaped portion surrounding a central portion that is concave toward the inner strainer.

25. The device of claim 24, further comprising a hole extending through the central portion of the inner lid.

* * * * *

UNITED STATES PATENT AND TRADEMARK OFFICE
CERTIFICATE OF CORRECTION

PATENT NO.         : 9,867,384 B2
APPLICATION NO.    : 15/449806
DATED              : January 16, 2018
INVENTOR(S)        : Fong Lin Page 1 of 1

It is certified that error appears in the above-identified patent and that said Letters Patent is hereby corrected as shown below:

On the Title Page

Item (57), (Abstract) at Line 6, Change "that that" to --that--.

In the Specification

In Column 2, Line 34, Change "that that" to --that--.

In Column 2, Line 66, Change "that that" to --that--.

In Column 3, Line 41, Change "that that" to --that--.

In Column 16 at Line 11, Change "and or" to --and/or--.

In the Claims

In Column 19 at Line 37, In Claim 1, change "that that" to --that--.

In Column 19 at Line 59, In Claim 2, change "that that" to --that--.

In Column 20 at Line 60, In Claim 8, change "that that" to --that--.

Signed and Sealed this
Fifteenth Day of May, 2018

Andrei Iancu
*Director of the United States Patent and Trademark Office*